US011576485B2

(12) United States Patent
Jackson et al.

(10) Patent No.: US 11,576,485 B2
(45) Date of Patent: Feb. 14, 2023

(54) FOOD PREPARATION TABLE AND ASSOCIATED FOOD PAN WITH THERMOWELL

(71) Applicant: ILLINOIS TOOL WORKS INC., Glenview, IL (US)

(72) Inventors: Steven T. Jackson, Fort Worth, TX (US); Austin M. Bieri, Burleson, TX (US); Brian L. Casserilla, Haslet, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 301 days.

(21) Appl. No.: 16/860,180

(22) Filed: Apr. 28, 2020

(65) Prior Publication Data

US 2020/0352322 A1 Nov. 12, 2020

Related U.S. Application Data

(60) Provisional application No. 62/844,848, filed on May 8, 2019.

(51) Int. Cl.
*A47B 31/02* (2006.01)
*A47J 41/00* (2006.01)
*A47B 31/00* (2006.01)

(52) U.S. Cl.
CPC .......... *A47B 31/02* (2013.01); *A47J 41/0061* (2013.01); *A47B 2031/003* (2013.01)

(58) Field of Classification Search
CPC .................... A47B 31/02; A47B 2031/003
USPC .................... 108/50.13, 26; 165/288
See application file for complete search history.

(56) References Cited

U.S. PATENT DOCUMENTS

| 2,677,365 | A | * | 5/1954 | Beland | A47J 36/2483 |
| | | | | | 108/50.13 |
| 3,478,193 | A | * | 11/1969 | Molitor | A47B 31/02 |
| | | | | | 296/22 |
| 4,739,580 | A | * | 4/1988 | Simmons | A47B 3/0818 |
| | | | | | 108/50.13 |
| 6,609,078 | B2 | | 8/2003 | Starling | |
| 6,850,861 | B1 | | 2/2005 | Faiola | |
| 9,068,773 | B2 | | 6/2015 | Lintker | |
| 9,671,155 | B2 | | 6/2017 | Delgadillo | |
| 9,943,178 | B2 | * | 4/2018 | Savinskiy | A47B 77/022 |
| 10,117,513 | B1 | * | 11/2018 | Tolentino | A47B 31/04 |
| 10,271,667 | B2 | * | 4/2019 | Wallinder | A47F 10/06 |

(Continued)

FOREIGN PATENT DOCUMENTS

WO WO-2015183156 A1 * 12/2015 ............. A47F 10/06
WO WO 2019012324 A1 1/2019

OTHER PUBLICATIONS

Amazon: Jaybird Cornelius (Corny) Keg Lid with 12 inch Thermowell by NorCal Brewing Solutions, https://www.amazon.com/Jaybird-Cornelius-Corny-inch-Thermowell/dp/B07CV37FGZ, retrieved Apr. 28, 2020, 5 pages, Admitted Prior Art.

(Continued)

*Primary Examiner* — Jose V Chen
(74) *Attorney, Agent, or Firm* — Thompson Hine LLP

(57) ABSTRACT

A food preparation table system includes a housing including a food item holding arrangement defining multiple food pan receiving locations. At least one food pan is located in one of the food pan receiving locations. A cooling system is provided for cooling the food pan. The food pan includes a wall at least in part defining a food receiving volume, a thermowell extending inward from the wall into the food receiving volume and a temperature sensor positioned within the thermowell. A food pan is also provided.

20 Claims, 16 Drawing Sheets

(56) References Cited

U.S. PATENT DOCUMENTS

| | | | |
|---|---|---|---|
| 2008/0000248 A1 | 1/2008 | Sanders | |
| 2012/0180705 A1* | 7/2012 | Hafner | H05B 6/12 |
| | | | 108/50.13 |
| 2012/0309285 A1* | 12/2012 | Majordy | A47F 3/0452 |
| | | | 108/50.13 |
| 2013/0057133 A1* | 3/2013 | Kool | A47B 31/04 |
| | | | 312/249.8 |
| 2017/0071409 A1 | 3/2017 | Veltrop | |
| 2017/0188720 A1 | 7/2017 | Palmnäs | |
| 2017/0261256 A1* | 9/2017 | Delgadillo | A47F 3/04 |
| 2017/0311753 A1 | 11/2017 | Roever | |
| 2018/0014635 A1* | 1/2018 | Turner | A47J 39/02 |
| 2018/0103778 A1 | 4/2018 | Olovsson | |
| 2019/0167014 A1* | 6/2019 | Seiss | A47F 3/0478 |
| 2020/0113326 A1* | 4/2020 | Shi | A47J 47/02 |
| 2020/0178729 A1* | 6/2020 | Ritchie | A47B 37/04 |
| 2021/0204754 A1* | 7/2021 | Bassill | F25B 21/04 |
| 2021/0251427 A1* | 8/2021 | Tyler | H05B 1/0261 |
| 2021/0267362 A1* | 9/2021 | Eckert | A47B 33/00 |
| 2022/0095837 A1* | 3/2022 | Bigott | A47J 39/006 |

OTHER PUBLICATIONS

Brewer's Friend, Fermenting in Corny Kegs, https://www.brewersfriend.com/forum/threads/fermenting-in-corny-kegs.6675/, posted Aug. 26, 2017, retrieved Apr. 28, 2020, 14 pages.

Butt Crack Brewer, Removable Corney Keg Thermowell, https://www.buttcrackbrewery.com/2017/11/01/removable-corney-keg-thermowell/ posted Nov. 1, 2017, retrieved Apr. 28, 2020, 4 pages.

* cited by examiner

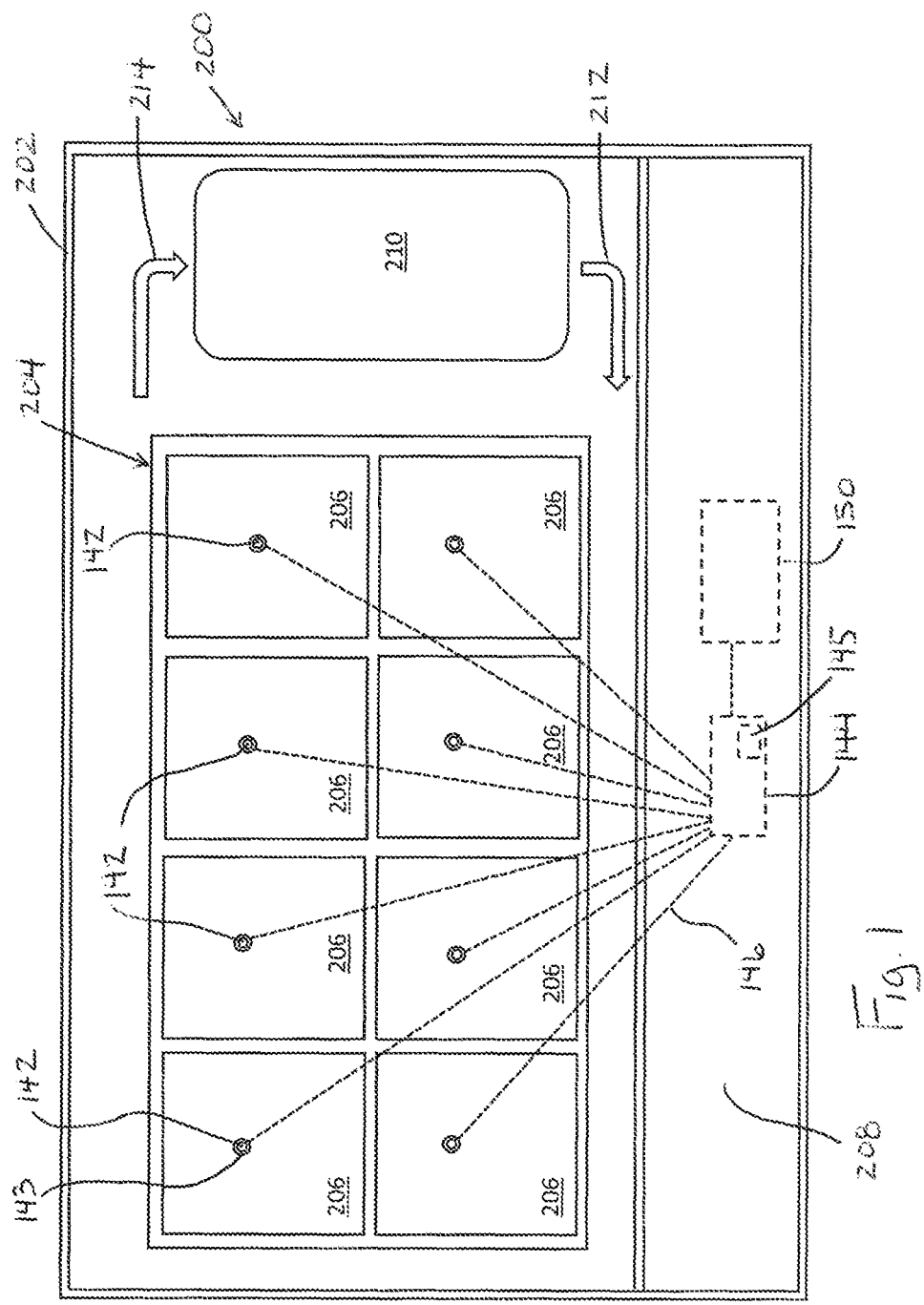

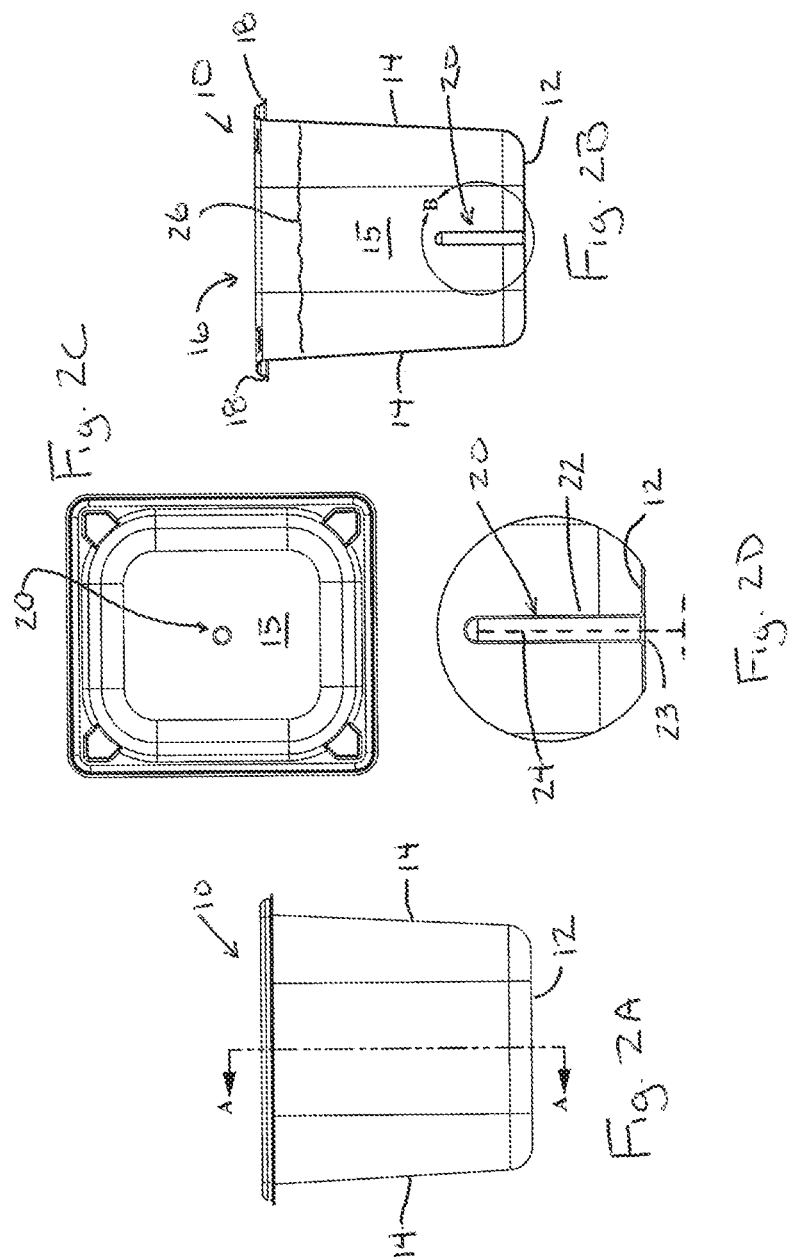

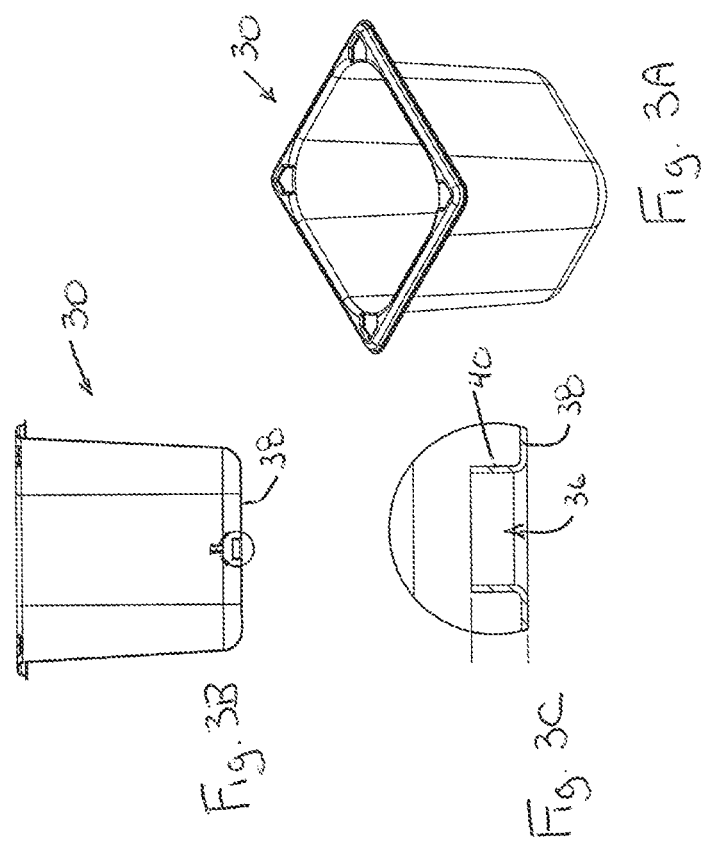

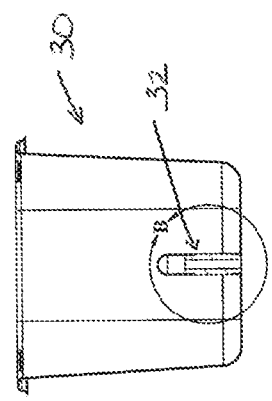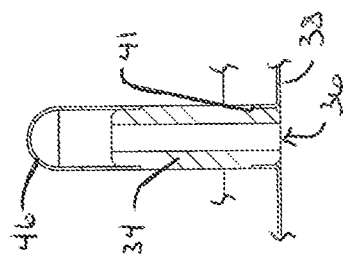
Fig. 6A
Fig. 6B

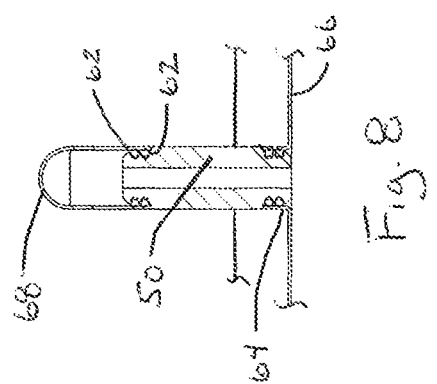

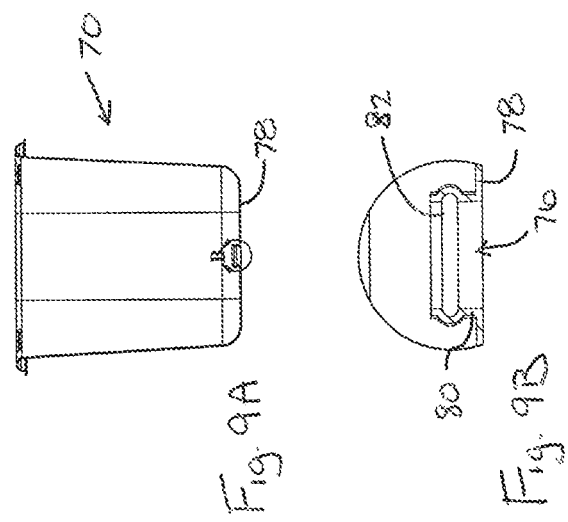

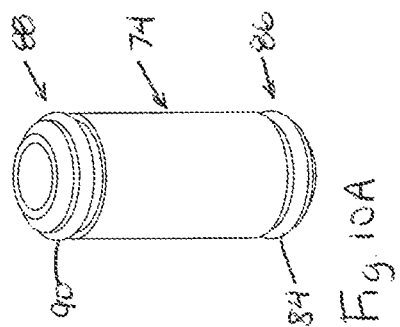
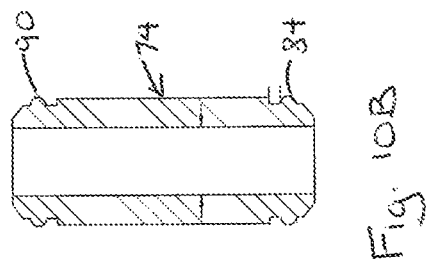

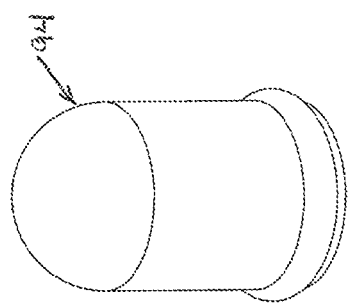
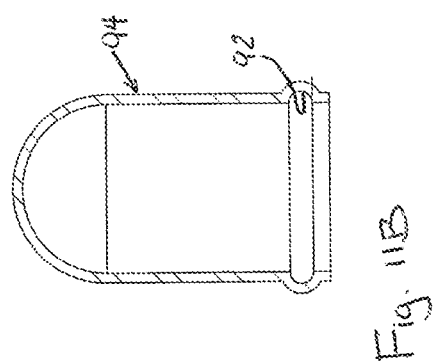

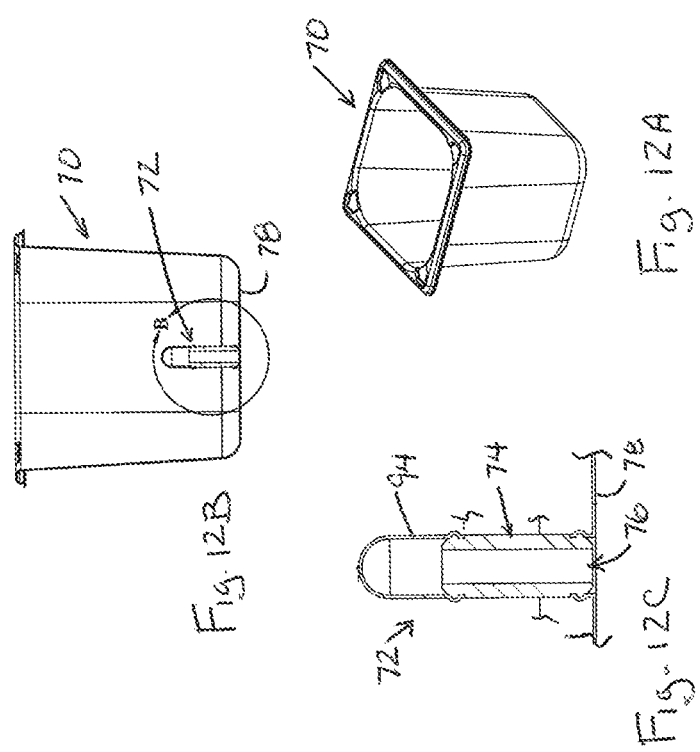

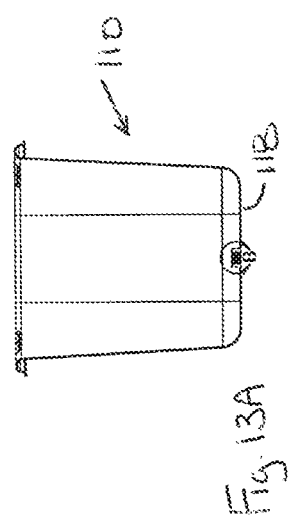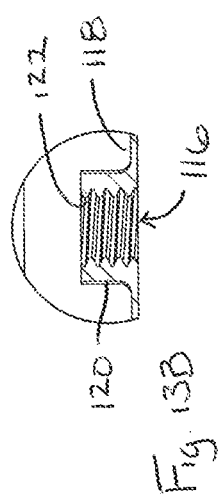

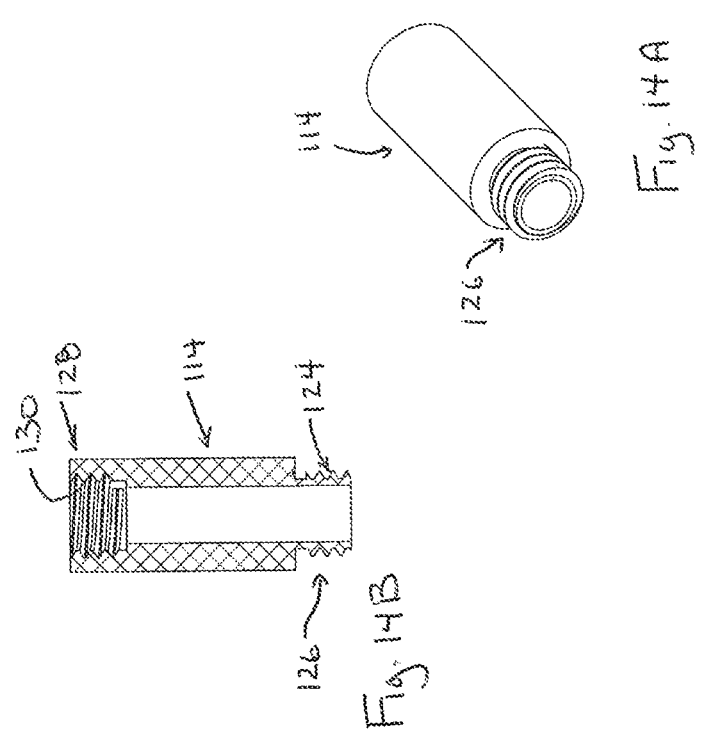

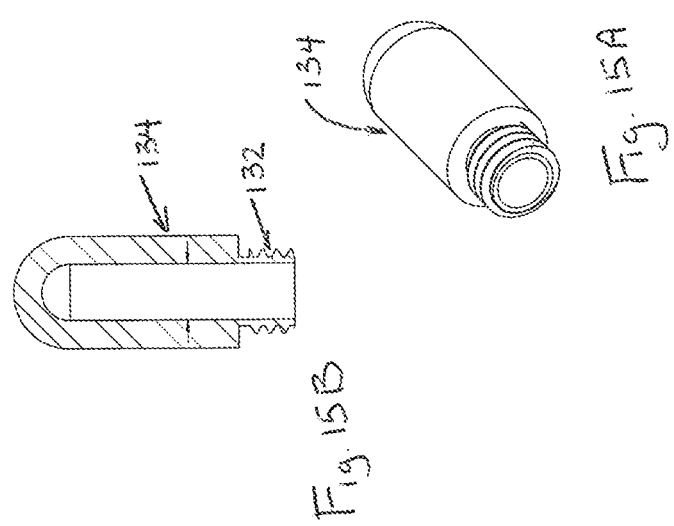

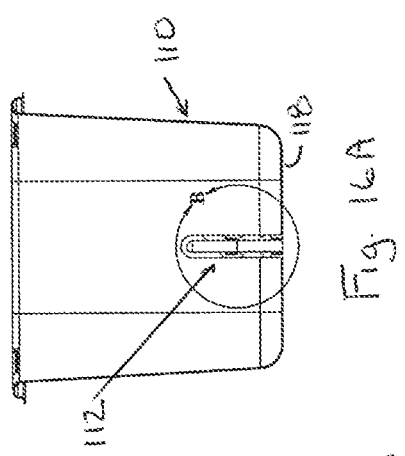
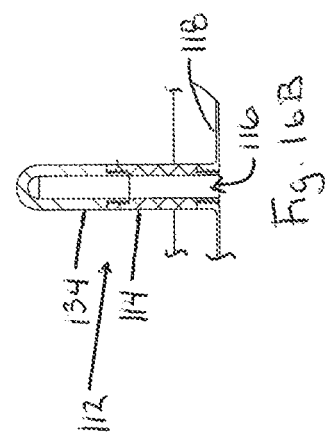

FOOD PREPARATION TABLE AND ASSOCIATED FOOD PAN WITH THERMOWELL

TECHNICAL FIELD

This application relates generally to food preparation tables and, more specifically, to food pans adapted for temperature monitoring and an associated food preparation table including such food pans.

BACKGROUND

Food preparation tables are commonly used in commercial establishments for preparing food products that incorporate multiple ingredients. A typical food preparation table includes a frame and housing structure having internal refrigeration or some other cooling system. An upper surface of the housing typically includes a front preparation surface that may be cooled and a rear food storage arrangement that may define multiple food pan wells (or other food pan receiving locations), each food pan well for holding on or more individual food pans for holding multiple individual food items that can be used in the preparation of food products. The pans are also cooled in order to keep the food items in the pans fresh. Examples of such food preparation tables are shown in U.S. Pat. Nos. 9,068,773 B2 and 9,943,178 B2 and U.S. Patent Publication No. 2008/0000248 A1, all of which are incorporated herein by reference.

Food freshness is an important consideration in these applications. Restaurants are required to probe their food periodically with a temperature probe and record the values. This operation is commonly done manually, and the data is recorded on a worksheet. Thus, the operation is labor intensive and prone to potential human error.

It would be desirable to provide a food preparation table that includes food pans that are adapted to enable automated temperature sensing.

SUMMARY

Food pans with built-in thermowells and temperature sensors offer the ability to automate data collection and better ensure proper food temperatures.

By way of example, a stainless steel food pan with a stainless steel thermowell is provided. A thermal break, made from food-safe plastic or ceramic material, can also be used to isolate the sensor or sensing region of the thermowell from the temperature of the food pan, so a better measurement of the temperature of the food is provided.

By way of example, the thermowell extends upward from the bottom wall of the pan, so that a temperature probe is inserted from the bottom, which does not interfere with access to the food in the pan via the open top of the pan. The temperature probe can be a thermocouple, RTD, thermistor or similar temperature sensing technology. The sensor is then connected to a measurement system (e.g., associated with a controller of a food preparation table), either using wires or via wireless technology such as Bluetooth or Near Field Communications.

Because the food fills the bottom of the pan, food temperatures can be measured and recorded automatically on a continuous basis by a controller incorporated into or otherwise associated with the food preparation table.

In one aspect, a food preparation table system includes a housing including a food item holding arrangement defining multiple food pan receiving locations. At least one food pan is located in one of the food pan receiving locations. A cooling system is provided for cooling the food pan. The food pan includes a wall at least in part defining a food receiving volume, a thermowell extending inward from the wall into the food receiving volume and a temperature sensor positioned within the thermowell.

In another aspect, a food pan for use in a food preparation table system includes a bottom wall and a plurality of upright walls defining a food receiving volume of the food pan, an upper access opening with a surrounding set of support rims and a thermowell extending inward from one of the walls into the food receiving volume.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 shows a schematic top plan view of a food preparation table system;

FIG. 2A is a side elevation of one embodiment of a food pan;

FIG. 2B is a cross-section of the food pan taken along line A-A of FIG. 2A;

FIG. 2C is a top plan view of the food pan;

FIG. 2D is an exploded cross-section view of the thermowell section of the food pan;

FIG. 3A is a perspective view of one embodiment of a food pan prior to completion of the thermowell;

FIG. 3B is a cross-section view of the food pan of FIG. 3A;

FIG. 3C is an enlarged cross-section view of the bottom wall opening of the food pan of FIG. 3A;

FIG. 6A shows a cross-section of the food pan of FIG. 3B assembled with the thermal break segment of FIG. 4B and the end segment of FIG. 5B;

FIG. 6B shows an enlarged cross-section of the thermowell portion of FIG. 6A;

FIG. 8 shows an enlarged cross-section of the thermowell section of the food pan of FIG. 3B assembled with the thermal break segment of FIG. 7B and the end segment of FIG. 5B;

FIG. 9A is a cross-section view of another embodiment of a food pan prior to completion of the thermowell;

FIG. 9B is an enlarged cross-section view of the bottom wall opening of the food pan of FIG. 9A;

FIG. 10A shows another embodiment of a thermal break segment for a food pan thermowell;

FIG. 10B shows a cross-section of the thermal break segment of FIG. 10A;

FIG. 11A shows another embodiment of an end segment for the thermowell;

FIG. 11B shows a cross-section of the end segment of FIG. 11A;

FIG. 12A shows a perspective view of the food pan of FIG. 9A assembled with the thermal break segment of FIG. 10A and the end segment of FIG. 11A;

FIG. 12B shows a cross-section of the food pan of FIG. 12A;

FIG. 12C shows an enlarged cross-section of the thermowell portion of FIG. 12B;

FIG. 13A is a cross-section view of another embodiment of a food pan prior to completion of the thermowell;

FIG. 13B is an enlarged cross-section view of the bottom wall opening of the food pan of FIG. 13A;

FIG. 14A shows another embodiment of a thermal break segment for a food pan thermowell;

FIG. 14B shows a cross-section of the thermal break segment of FIG. 14A;

FIG. 15A shows another embodiment of an end segment for the thermowell;

FIG. 15B shows a cross-section of the end segment of FIG. 15A;

FIG. 16A shows a cross-section view of the food pan of FIG. 13A assembled with the thermal break segment of FIG. 14B and the end segment of FIG. 15B; and FIG. 16B shows an enlarged cross-section of the thermowell portion of FIG. 16A.

DETAILED DESCRIPTION

Figure 4A:
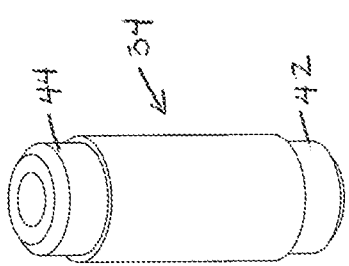
FIG. 4A shows one embodiment of a thermal break segment for a food pan thermowell.
Figure 4B:
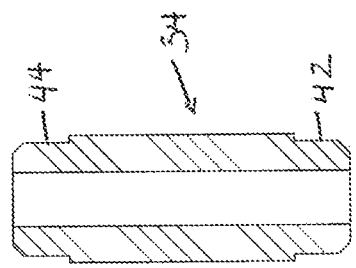
FIG. 4B shows a cross-section of the thermal break segment of FIG. 4A.
Figure 5A:
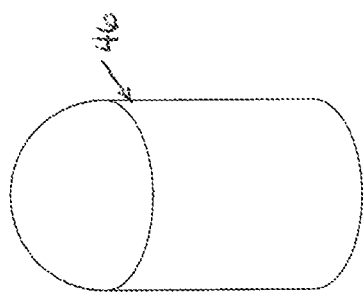
FIG. 5A shows one embodiment of an end segment for the thermowell.
Figure 5B:
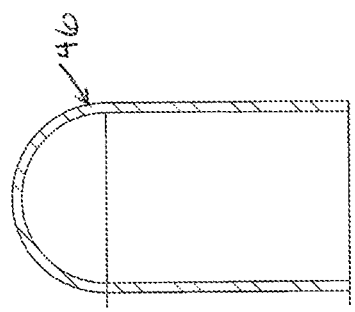
FIG. 5B shows a cross-section of the end segment of FIG. 5A.

Referring to FIG. 1, a food preparation table system 200 is shown schematically and includes a housing 202 (e.g., frame and panels) with a food item holding arrangement 204 (e.g., upper housing section with a recessed well area and support bars) defining multiple food pan receiving locations 206. Each food pan receiving location supports, or is configured to support, at least one food pan. A front section of the food preparation table system defines a working counter 208 at which food products can be prepared be selecting from among the various food items in the multiple pans. A cooling system 210 is provided for cooling the food pans using a cooling fluid, per arrows 212, 214. In one implementation, the cooling system could be an air cooling system (e.g., with associated evaporator, compressor and condenser) that blows cooled air under, around and/or over the food pans, such as that described in U.S. Patent Publication No. 2008/0000248 A1. In another implementation, the cooling system could circulate a chilled liquid coolant to the food pans, such as that described in U.S. Pat. No. 9,068,773 B2. Other cooling system variations are possible as well.

Referring to FIGS. 2A-2D, an exemplary food pan 10 (e.g., aluminum or stainless steel) includes a bottom wall 12 and upright sidewalls 14 to define an internal food receiving space or volume 15, and an open top 16 surrounded by side support rims 18. A thermowell, or temperature sensor receiving and guarding space, 20 is provided within the pan. Here, the thermowell 20 extends upward from the bottom wall 12 of the pan, substantially at a center of the bottom wall. Here, the thermowell is formed by a stainless steel tubular member 22, which is closed at the top, and that is monolithic with or connected directly to the bottom wall 12 and an opening 23 in the bottom wall leads into the internal space defined by the thermowell. An exemplary temperature sensor 24, shown schematically in dashed line form, extends up through the opening 23 and into the thermowell so that a sense portion of the sensor is within the thermowell and spaced above the bottom wall 12. The temperature sensor 24 could be in contact with the tubular wall or top wall of member 22. The temperature sensed by the sensor 24 is indicative of the temperature of food product 26 within the food pan. The thermowell 20 defines a barrier between the temperature sensor 24 and food 26 within the food receiving volume 15, which barrier prevents direct contact between the temperature sensor and the food.

Cooling systems for food preparation tables often involve cooling the wall surfaces of the food pan itself in order to maintain a cool temperature of the food product. Therefore, in some implementations, thermally isolating the thermowell from the pan walls will result in temperature sensing that is more accurately reflective of the food product temperature in the pan.

Referring to FIGS. 3A-3C, 4A-4B, 5A-5B and 6A-6B, a food pan 30 in which the thermowell 32 includes a thermal break segment 34 is shown. The thermal break segment is formed by a tubular member of thermal insulating material (e.g., a polymer material). The tubular member includes an internal passage into which the temperature sensor can be placed. Here, the sensor opening 36 in the bottom wall 38 of the food pan includes an upwardly turned rim 40 to which the thermal break segment 34 is fixed (e.g., by a food grade epoxy at joint 41). The thermal break segment 38 includes a reduced diameter bottom end section 42 to fit within the space of the rim 40 for this purpose. The thermal break segment 38 also includes a reduced diameter top end section 44 to which an end segment of the thermowell barrier is connected. Here, the end segment is in the form of a metal (e.g., aluminum or stainless steel) closure cap 46 that can be placed (e.g. secured by food grade epoxy). In this assembly, the metal closure cap 46 provides the desired thermal contact with food product in the pan that will enable an inserted temperature sensor to accurately detect the temperature of the food product. Generally, a thermal conductivity of the thermal break segment 38 is much lower than both a thermal conductivity of the wall 38 and rim 40 and a thermal conductivity of the end segment. For example, the thermal conductivity of the thermal break segment 38 may be no more than five percent (5%) of the thermal conductivity of the wall 38 and rim 40 and the thermal conductivity of the end segment.

Figure 7A:
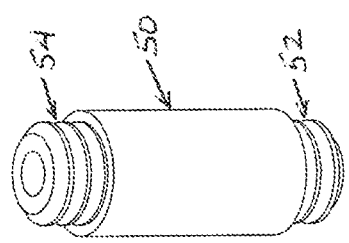
FIG. 7A shows one embodiment of a thermal break segment for a food pan thermowell.
Figure 7B:
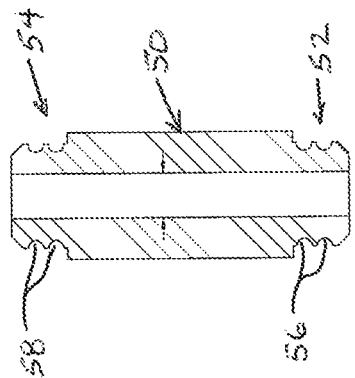
FIG. 7B shows a cross-section of the thermal break segment of FIG. 7A.

FIGS. 7A-7B and 8 show an embodiment in which the thermal break segment 50 includes lower and upper end sections 52 and 54 with respective pairs of O-ring grooves 56 and 58. O-rings 60 and 62 are seated in the grooves and provide gasket press-fit connection to both the upturned rim 64 of the food pan bottom wall 66 and the metal (e.g., aluminum or stainless steel) closure cap 68.

FIGS. 9A-9B, 10A-10B, 11A-11B and 12A-12C show an embodiment in which the food pan 70 has a thermowell 72 with a thermal break segment 74 that is snap-fit to both the pan and the metal cap. Here, the sensor opening 76 in the bottom wall 78 of the food pan includes an upwardly turned rim 80 with an internal snap-groove 82 to which the thermal break segment 74 is connected by an exterior annular snap-projection feature 84 at the reduced diameter bottom end section 86. The thermal break segment also includes a reduced diameter top end section 88 with an exterior annular snap-projection 90 to which an internal snap-groove 92 of a metal (e.g., aluminum or stainless steel) closure cap 94 connects.

FIGS. 13A-13B, 14A-14B, 15A-15B and 16A-16B show an embodiment in which the food pan 110 has a thermowell 112 with a thermal break segment 114 that is threadedly connected to both the pan wall 118 and the metal cap 134. Here, the sensor opening 116 in the bottom wall 118 of the food pan includes an upwardly turned rim 120 with internal threads 122 to which the thermal break 114 is connected by an external thread feature 124 at the reduced diameter bottom end section 126. The thermal break segment also includes a top end section 128 with an internal thread feature 130 into which a threaded end 132 of the metal (e.g., aluminum or stainless steel) closure cap 134 threadedly connects.

Each of the thermal break segment shown should, preferably, have a relatively low thermal conductivity compared to the pan bottom wall and the thermowell end segment, as described above.

Regardless of the food pan embodiment utilized, the pans are incorporated into a food preparation table, such as that of FIG. 1, so that a controller can automatically record the temperatures of the multiple temperature sensors within the thermowells of the multiple food pans holding food product. FIG. 1 schematically depicts such an arrangement, by way of pans with temperature sensors 142 (each in a thermowell 143) and a controller 144 (with a memory 145) connected by one or more communication paths 146 (e.g., wired or wireless) to each of the sensors. The controller 144 may store the temperature date locally in the memory 145 and/or send the temperature data to remote systems. A user interface 150 (e.g., on the food preparation table or remote from the table at a computer) may be used to access the food temperature data and produce reports etc. In one implementation, the controller is configured to read temperature sensor data from the temperature sensors and to record the temperature sensor data in a log in the memory 145. The controller 144 is also configured to repeatedly read temperature sensor data from the temperature sensors over time and to store each temperature sensor data reading in the log in association with both a time stamp and an identifier specific to the temperature sensor associated with the reading.

Moreover, the food pan thermowell temperature(s) could also be used to control the cooling system 210. For example, the temperature of the cooling fluid (e.g., chilled air or chilled liquid coolant) could be adjusted based upon the food pan thermowell temperature(s) and/or the volumetric flow rate of the cooling fluid could be adjusted based upon the food pan thermowell temperature(s). In one implementation, the controller 144 is configured to calculate an average of all the food pan thermowell temperatures, as well as the standard deviation, with a goal of keeping the majority of the temperatures above 32.0° F. and less than 41.0° F. At temperatures below 32.0° F., ice crystals can form which will damage food. Above 41.0° F., food is out of the desired temperature zone. Using the average as the process variable, a PID or simple proportional band control algorithm incorporated into the controller could be used to modulate the solenoid valve and compressor combination of the cooling system. Control of one or more fans or pumps of the cooling system could also be implemented based upon the food pan thermowell temperatures.

In more advanced implementations, the controller could incorporate criteria that enables empty food pans to be treated differently because the empty pans could bias the average temperature. For example, the controller could be configured with a criteria that throws out temperature readings above/below a threshold, because empty pans are going to read differently than pans with food. The controller 144 could also be configured to enable an operator to select which food pans hold food product and which do not, in which case the controller could simply ignore temperature indications from the food pans designated as empty.

As used herein the term "controller" is intended to encompass any circuit (e.g., solid state, application specific integrated circuit (ASIC), an electronic circuit, a combinational logic circuit, a field programmable gate array (FPGA)), processor(s) or microprocessor(s) (e.g., shared, dedicated, or group—including hardware or software that executes code), software, firmware and/or other components, or a combination of some or all of the above, that carries out the control functions.

It is to be clearly understood that the above description is intended by way of illustration and example only, is not intended to be taken by way of limitation, and that other changes and modifications are possible. For example, various different materials could be used. In addition, different control schemes could also be implemented.

What is claimed is:

1. A food preparation table system, comprising:
   a housing including a food item holding arrangement defining multiple food pan receiving locations;
   at least one food pan located in one of the food pan receiving locations;
   a cooling system for cooling the food pan;
   wherein the food pan comprises:
   a pan wall at least in part defining a food receiving volume;
   a thermowell extending inward from the pan wall and into the food receiving volume; and
   a temperature sensor positioned within the thermowell so as to be positioned for sensing a temperature of food within the food receiving volume of the food pan.

2. The food preparation table system of claim 1, further comprising:
   a controller operatively connected to the temperature sensor and configured to read temperature sensor data from the temperature sensor and to record the temperature sensor data in a log in a memory of the controller.

3. The food preparation table system of claim 2, wherein the controller is configured to repeatedly read temperature sensor data from the temperature sensor over time and store each temperature sensor data reading in the log in association with both a time stamp and an identifier specific to the temperature sensor.

4. The food preparation table system of claim 1, wherein the thermowell defines a barrier between the temperature sensor and food within the food receiving volume, which barrier prevents direct contact between the temperature sensor and food within the food receiving volume of the food pan.

5. The food preparation table system of claim 4, wherein the barrier includes a thermal break segment between the pan wall and a temperature sense section of the thermowell.

6. The food preparation table system of claim 5, wherein the pan wall is formed of a metal material and the thermal break segment is formed of a polymeric material, and a thermal conductivity of the thermal break segment is lower than a thermal conductivity of the pan wall.

7. The food preparation table system of claim 6, wherein the thermal conductivity of the thermal break segment is no more than five percent of the thermal conductivity of the pan wall.

8. The food preparation table system of claim 5, wherein the barrier includes an end segment adjacent the thermal break segment and defining the temperature sense section of the thermowell, wherein a thermal conductivity of the thermal break segment is no more than five percent of a thermal conductivity of the end segment.

9. The food preparation table system of claim 5, wherein the pan wall includes an opening defined by a rim that extends inwardly toward the food receiving volume, wherein the thermal break segment is connected to the rim of the opening by at least one of (i) a food grade epoxy, (ii) a gasketed press-fit connection, (iii) a snap-fit connection or (iv) a threaded connection.

10. The food preparation table system of claim 1, further comprising a multiplicity of additional food pans, wherein each additional food pan is located in one of the food pan receiving locations, and wherein each additional food pan comprises:
  a wall at least in part defining a food receiving volume;
  a thermowell extending inward from the wall into the food receiving volume; and
  a temperature sensor positioned within the thermowell.

11. The food preparation table system of claim 1, further comprising:
  a controller operatively connected to the temperature sensor and configured to read temperature sensor data from the temperature sensor, wherein the controller is configured to control the cooling system based at least in part upon the temperature sensor data from the temperature sensor.

12. The food preparation table system of claim 11, wherein the controller is configured to control at least one of a valve, a compressor, a fan or a pump of the cooling system based at least in part upon the temperature sensor data from the temperature sensor.

13. A food pan for use in a food preparation table system, the food pan comprising:
  a plurality of walls including a bottom wall and a plurality of upright walls defining a food receiving volume of the food pan;
  an upper access opening with a surrounding set of support rims;
  a thermowell extending inward from one of the walls and into the food receiving volume and defining a temperature sensor receiving space that projects into the food receiving volume of the food pan.

14. The food pan of claim 13, wherein the thermowell defines a barrier between the temperature sensor and the food receiving volume, for preventing direct contact between the temperature sensor and food.

15. The food pan of claim 14, wherein the barrier includes a thermal break segment between the wall and a temperature sense section of the thermowell.

16. The food pan of claim 15, wherein the wall of the food pan is formed of a metal material and the thermal break segment is formed of a polymeric material, and a thermal conductivity of the thermal break segment is lower than a thermal conductivity of the wall.

17. The food pan of claim 16, wherein the thermal conductivity of the thermal break segment is no more than one percent of the thermal conductivity of the wall.

18. The food pan of claim 15, wherein the barrier includes an end segment adjacent the thermal break segment and defining the temperature sense section of the thermowell, wherein a thermal conductivity of the thermal break segment is no more than one percent of a thermal conductivity of the end segment.

19. The food pan of claim 15, wherein the wall includes an opening defined by a rim that extends inwardly toward the food receiving volume, wherein the thermal break segment is connected to the rim of the opening by at least one of (i) a food grade epoxy, (ii) a gasketed press-fit connection, (iii) a snap-fit connection or (iv) a threaded connection.

20. A food pan for use in a food preparation table system, the food pan comprising:
  a plurality of walls, including a bottom wall and multiple upright walls defining a food receiving volume of the food pan;
  an upper access opening with a surrounding set of support rims;
  a thermowell extending inward from a first one of the walls and into the food receiving volume, the thermowell defining an internal temperature sensor receive space, wherein the thermowell acts as a barrier between the internal temperature sensor receiving space and the food receiving volume, wherein the barrier includes a thermal break segment between the first one of the walls and a temperature sense section of the thermowell.

* * * * *